United States Patent
Lu et al.

(10) Patent No.: US 9,891,470 B2
(45) Date of Patent: Feb. 13, 2018

(54) REFLECTOR SHEET, BACKLIGHT MODULE AND DISPLAY APPARATUS

(71) Applicant: BOE Technology Group Co., Ltd., Beijing (CN)

(72) Inventors: Yongchun Lu, Beijing (CN); Yong Qiao, Beijing (CN); Hongfei Cheng, Beijing (CN); Jianbo Xian, Beijing (CN); Yongda Ma, Beijing (CN); Jian Xu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 40 days.

(21) Appl. No.: 14/787,615

(22) PCT Filed: Apr. 21, 2015

(86) PCT No.: PCT/CN2015/077027
§ 371 (c)(1),
(2) Date: Oct. 28, 2015

(87) PCT Pub. No.: WO2016/050056
PCT Pub. Date: Apr. 7, 2016

(65) Prior Publication Data
US 2016/0091759 A1    Mar. 31, 2016

(30) Foreign Application Priority Data
Sep. 30, 2014   (CN) .................... 2014 2 0574881 U (51) Int. Cl.
*G02F 1/13357* (2006.01)
*G02F 1/1335* (2006.01)

(52) U.S. Cl.
CPC .. *G02F 1/133605* (2013.01); *G02F 1/133603* (2013.01)

(58) Field of Classification Search
CPC ......... G02F 1/133603; G02F 1/133605; F21V 7/0083; F21V 2105/12; F21V 2105/16; F21V 2105/18
(Continued)

(56) References Cited

U.S. PATENT DOCUMENTS 7,478,929 B2 * 1/2009 Kim ................... G02F 1/133605
349/67
8,651,685 B2 * 2/2014 Roberts ............. G02F 1/133603
362/240
(Continued)

FOREIGN PATENT DOCUMENTS

CN       101021646 A      8/2007
CN       203349065 U      12/2013
(Continued)

OTHER PUBLICATIONS

Jul. 9, 2015—International Search Report and Written Opinion Appn PCT/CN2015/077027 with English Tran.

*Primary Examiner* — Julie Bannan
(74) *Attorney, Agent, or Firm* — Banner & Witcoff, Ltd.

(57) ABSTRACT

A reflector sheet, a backlight module and a display apparatus, which relate to the display technical field, are provided. They can reserve a space for deformation during thermal expansion of the reflector sheet and prevent the reflector sheet from being deformed, thereby avoiding uneven light. The reflector sheet comprises a reflector sheet body and apertures located in the reflector sheet body and configured for allowing a luminous body to pass therethrough, the apertures comprising first apertures and second apertures, wherein each of the first apertures is configured for relatively fixing a luminous body passing therethrough and the reflector sheet body, and each of the second apertures is configured for reserving a gap between a luminous body (Continued)

passing therethrough and the reflector sheet body. Also disclosed is use of the reflector sheet for manufacturing a display apparatus.

16 Claims, 3 Drawing Sheets

(58) Field of Classification Search
USPC .................................................. 362/97.3
See application file for complete search history.

(56) References Cited

U.S. PATENT DOCUMENTS

| | | | | |
|---|---|---|---|---|
| 2007/0153511 A1* | 7/2007 | Chou | ................ | G02F 1/133605 362/227 |
| 2007/0297163 A1* | 12/2007 | Kim | ................ | G02F 1/133603 362/23.11 |
| 2008/0111951 A1* | 5/2008 | Chang | ................ | G02B 6/003 349/65 |
| 2009/0067172 A1* | 3/2009 | Inoue | ................ | F21S 8/026 362/240 |
| 2010/0038657 A1* | 2/2010 | Higuchi | ................ | F21S 8/02 257/88 |
| 2010/0208171 A1* | 8/2010 | Yamazaki | ................ | G02F 1/133603 349/67 |
| 2011/0096265 A1* | 4/2011 | Murakoshi | ................ | G02F 1/133603 349/64 |
| 2011/0292316 A1* | 12/2011 | Fujimoto | ................ | G02F 1/133603 349/58 |
| 2012/0002425 A1* | 1/2012 | Shimizu | ................ | F21S 2/005 362/294 |
| 2013/0051017 A1* | 2/2013 | Heim | ................ | F21S 8/04 362/247 |
| 2013/0100648 A1* | 4/2013 | Nozawa | ................ | G09F 13/04 362/97.2 |
| 2013/0215611 A1* | 8/2013 | Wong | ................ | F21V 7/0083 362/243 |

FOREIGN PATENT DOCUMENTS

| | | |
|---|---|---|
| CN | 103511991 A | 1/2014 |
| CN | 204127877 U | 1/2015 |
| JP | 10104408 A | 4/1998 |

* cited by examiner

REFLECTOR SHEET, BACKLIGHT MODULE AND DISPLAY APPARATUS

The application is a U.S. National Phase Entry of International Application No. PCT/CN2015/077027 filed on Apr. 21, 2015, designating the United States of America and claiming priority to Chinese Patent Application No. 201420574881.3 submitted on Sep. 30, 2014. The present application claims priority to and the benefit of the above-identified applications and the above-identified applications are incorporated by reference herein in their entirety.

TECHNICAL FIELD

The embodiments of the present invention relate to a reflector sheet, a backlight module and a display apparatus.

BACKGROUND ART

With the rapid development of the liquid crystal display (LCD) industry, various types of new liquid crystal display products have been produced. Since an LCD panel is a non-self-luminous display panel, it can only exert its display function with the aid of a light source provided by a backlight module. Depending on the position of the light source in the backlight module, the backlight module can be either edge-lit or direct-lit, wherein in a direct-lit backlight module, the light source is disposed below the LCD panel so that the LCD panel can gain a high light source intensity. Therefore, LCD products of this type are generally used in displays with a high demand for brightness such as a computer screen and a liquid-crystal display television.

Figure 1:
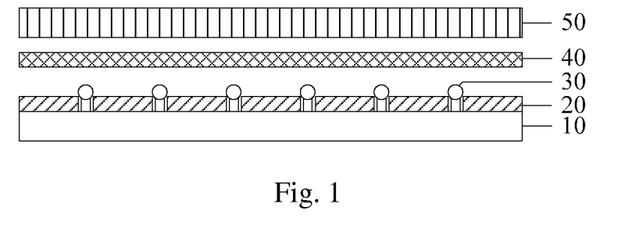
FIG. 1 is a structural schematic view of a display apparatus in the prior art.

In current direct-lit backlight modules, as shown in FIG. 1, a plurality of luminous bodies 30 arranged in an array, for example, light-emitting diode (abbreviated as LED) devices, are fixed on a back plate 10, wherein a reflector sheet 20 laminated on the back plate 10 is provided with a plurality of apertures corresponding to the above LED devices, the shape and size of the apertures matching that of the LED devices; as such, the relative position of the reflector sheet 20 can be fixed by the LED devices passing through the above apertures.

However, in the backlight module with the above structure, the size of the apertures of the reflector sheet 20 is equivalent to that of the LED device; in this case, the prolonged heating of the LED device may lead to expansion of part of the reflector sheet 20 around the LED device, and the deformation stress caused by the expansion has nowhere to release, thereby causing the reflector sheet 20 to deform, resulting in uneven reflection of light.

SUMMARY OF THE INVENTION

The embodiments of the present invention provide a reflector sheet, a backlight module, and a display apparatus, which can reserve a space for deformation during thermal expansion of the reflector sheet and prevent the reflector sheet from being deformed, thereby avoiding uneven light-exiting.

To achieve the above object, the embodiments of the present invention employ the following technical solutions:

A aspect of the present invention provides a reflector sheet comprising a reflector sheet body and apertures located in the reflector sheet body and configured for allowing a luminous body to pass therethrough, the apertures comprising first apertures and second apertures, wherein each of the first apertures is configured for relatively fixing a luminous body passing therethrough and the reflector sheet body, and each of the second apertures is configured for reserving a gap between a luminous body passing therethrough and the reflector sheet body.

In some embodiments, the first apertures are arranged linearly in the reflector sheet body, the second apertures are arranged linearly in the reflector sheet body, and the first apertures are arranged in a direction parallel to that of the second apertures.

In some further embodiments, the first apertures that are arranged linearly and the second apertures that are arranged linearly are arranged alternately.

In some embodiments, the first apertures are arranged in a regular polygonal array in the reflector sheet body, and the second apertures are located at a center of each regular polygon of the regular polygonal array; or the second apertures are arranged in a regular polygonal array in the reflector sheet body, and the first apertures are located at a center of each regular polygon of the regular polygonal array.

In some embodiments, each of the first apertures has a shape selected from the group consisting of a Reuleaux triangle, a circle, an oval and a rectangle, and/or each of the second apertures has a shape selected from the group consisting of a Reuleaux triangle, a circle, an oval and a rectangle.

Another aspect of the present invention provides a backlight module, comprising a back plate and luminous bodies fixed on the back plate; the backlight module further comprises the above reflector sheet; wherein luminous surfaces of the luminous bodies are located on a side of the reflector sheet facing away from the back plate.

In some embodiments, the luminous bodies comprise a plurality of light-emitting diode devices.

Also in some embodiments, each of the first apertures of the reflector sheet has a shape and a size matching that of the light-emitting diode devices; each of the second apertures of the reflector sheet has a shape matching that of the light-emitting diode devices, and each of the second apertures of the reflector sheet has a size greater than that of the light-emitting diode devices.

Further, in some embodiments, each of the second apertures in an intermediate region of the reflector sheet has a size greater than that of each of the second apertures in a peripheral region of the reflector sheet. In the present application, the term "intermediate region" refers to a region which is present surrounding the geometric gravity of the surface of the reflector sheet and has a shape similar to that of the reflector sheet and an area that is ½ of that of the entire reflector sheet. Then, a second aperture whose geometric gravity is within the intermediate region (including the edge) is referred to as a second aperture in an intermediate region of the reflector sheet; a second aperture whose geometric gravity is outside the intermediate region is referred to as a second aperture in a peripheral region.

Still another third aspect of the present invention provides a display apparatus comprising a display panel and a backlight module, the backlight module being the above backlight module.

The embodiments of the present invention provide a reflector sheet, a backlight module and a display apparatus, the reflector sheet comprising a reflector sheet body and apertures located in the reflector sheet body and configured for allowing a luminous body to pass therethrough, the apertures comprising first apertures and second apertures, wherein each of the first apertures is configured for relatively fixing a luminous body passing therethrough and the reflector sheet body, and each of the second apertures is configured for reserving a gap between a luminous body passing therethrough and the reflector sheet body.

On this basis, by providing the reflector sheet body with first apertures and second apertures, the relative position of the reflector sheet can be defined by the first apertures and a space can be reserved for deformation during the volume expansion of the reflector sheet by the second apertures; as such, during the continuous heating process of the luminous body, the reflector sheet can release the deformation stress resulting from thermal expansion, thereby preventing uneven reflection of light caused by deformation of the reflector sheet and improving display quality.

BRIEF DESCRIPTION OF THE DRAWINGS

In order to illustrate the technical solutions of the embodiments of the present invention more clearly, the drawings of the embodiments are simply described below. Apparently, the drawings described below relate to only some embodiments of the present invention but are not of limitation to the present invention.

REFERENCE SIGNS

10: back plate; 20: reflector sheet; 201: first apertures; 202: second apertures; 203: reflector sheet body; 30: luminous body; 40: optical film; 50: display panel.

DETAILED DESCRIPTION

To make clearer the object, technical solutions and advantages of the embodiments of the present invention, a clear and full description of the technical solutions of the embodiments of the present invention will be made with reference to the accompanying drawings of the embodiments of the present invention. Obviously, the described embodiments are merely part of the embodiments of the present invention, but not all the embodiments. Based on the embodiments of the present invention described, all the other embodiments acquired by those skilled in the art, without any creative labor, fall within the scope of protection of the present invention.

An embodiment of the present invention provides a reflector sheet 20, as shown in FIG. 2 to FIG. 5, comprising a reflector sheet body 203 and apertures located in the reflector sheet body 203 and configured for allowing a luminous body to pass therethrough, the apertures comprising first apertures 201 and second apertures 202, wherein each of the first apertures 201 is configured for relatively fixing a luminous body passing therethrough and the reflector sheet body 203, and each of the second apertures 202 is configured for reserving a gap between a luminous body passing therethrough and the reflector sheet body 203.

It should be noted that first of all, the reflector sheet 20 is applied to a backlight module, the apertures in the reflector sheet 20 being configured for allowing a luminous body in the backlight module to pass therethrough; in this case, the luminous bodies are preferably point light source luminous bodies, for example, an LED device.

Secondly, the first apertures 201 and the second apertures 202 provided in the reflector sheet body 203 have different functions, and therefore their sizes will also be different.

Each of the first apertures 201 is configured for achieving the relative fixation between the luminous body and the reflector sheet body 203. That is to say, the luminous body passing through each of the first apertures 201 can prevent the relative movement of the reflector sheet 20 in all directions parallel to the reflector sheet 20. On this basis, it is known that the first apertures 201 and the luminous body necessarily need to contact each other, and there is an applied force preventing the relative movement of the reflector sheet 20 in two mutually perpendicular directions parallel to the reflector sheet 20. For example, the shape of the luminous body can be cylindrical (i.e., the cross-sectional shape of the luminous body on the surface of the reflector sheet 20 is circular), in which case, the shape of the first apertures 201 can be a circle matching the above circle, or a circumscribed triangle of the above circle, or a circumscribed rectangle of the above circle, which will not be specified herein as long as it can be used for defining the relative position of the reflector sheet 20. Therefore, in the present invention, the term "has a shape and a size matching", when used to describe first apertures, means that the first apertures can achieve the object of "fixing or defining the relative position of the reflector sheet 20", or the object of "relatively fixing a luminous body passing through the first apertures and the reflector sheet body". This object can be achieved specifically by contacting three or more contact points present in each of the first apertures of the reflector sheet with a luminous body passing through the first aperture. In the case of a full contact of a first aperture with a luminous body passing through the first aperture, it is deemed that there exist numerous contact points.

The second apertures 202 need not only to allow the luminous body to pass therethrough, but also to reserve a space for deformation between a luminous body passing therethrough and the reflector sheet body 203 to release the deformation stress resulting from thermal expansion. On this basis, it is known that the second apertures 202 cannot contact the luminous body, or there at least exists a certain non-contacting region so as to ensure that there is a space for deformation between the reflector sheet body 203 and a luminous body passing through the second apertures 202. On this basis, each of the second apertures 202 may have a different size, wherein the second apertures 202 may have a relatively larger size in a region where thermal deformation is relatively more serious, for example, in a intermediate region of the reflector sheet 20; the second apertures 202 may have a relatively smaller size in a region where thermal deformation is relatively less serious, for example, in a peripheral region of the reflector sheet 20. Therefore, in the present invention, the term "has a shape matching", when used to describe second apertures, means that the second apertures can achieve the object of "reserving a gap between a luminous body passing through the second apertures and the reflector sheet body", i.e., the second apertures allow the luminous body passing therethrough to pass through, and reserve a necessary gap. The term "size" with respect to the first apertures and the second apertures in the present invention shall be construed as the area of the first apertures and the second apertures; moreover, as to a luminous body, a light-emitting diode device, or a point light source luminous body, the term "size" shall be construed as the cross-sectional area of the luminous body, the light-emitting diode device or the point light source luminous body at the passing through place of the first apertures and the second apertures.

Thirdly, each of the first apertures 201 may have a shape that is the same as or different from that of each of the second apertures 202, which will not be specified herein. However, considering the function of the first apertures 201, it is possible to allow the first apertures 201 to have a shape matching that of the luminous body. On this basis, in order to simplify the preparation process of the reflector sheet 20, the first apertures 201 and the second apertures 202 may have the same shape.

An embodiment of the present invention provides a reflector sheet 20, comprising a reflector sheet body 203 and apertures located in the reflector sheet body 203 and configured for allowing a luminous body to pass therethrough, the apertures comprising first apertures 201 and second apertures 202, wherein each of the first apertures 201 is configured for relatively fixing a luminous body passing therethrough and the reflector sheet body 203, and each of the second apertures 202 is configured for reserving a gap between a luminous body passing therethrough and the reflector sheet body 203.

On this basis, by providing the reflector sheet body 203 with first apertures 201 and second apertures 202, the relative position of the reflector sheet 20 can be defined by the first apertures 201 and a space for deformation can be reserved for the volume expansion of the reflector sheet 20 by the second apertures 202; as such, during the continuous heating process of the luminous body, the reflector sheet 20 can release the deformation stress resulting from thermal expansion, thereby preventing uneven reflection of light caused by deformation of the reflector sheet 20 and improving display quality.

In view of the above description, the positions of the apertures in the reflector sheet body 203 shall be corresponding to that of the luminous body in the backlight module. On this basis, the first apertures 201 and the second apertures 202 can be specifically arranged in various modes.

Figure 2:
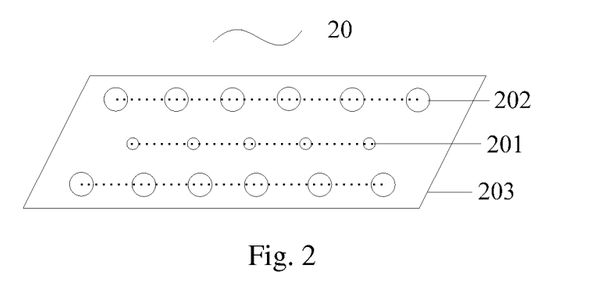
FIG. 2 is a structural schematic view I of a reflector sheet according to an embodiment of the present invention.
Figure 3:
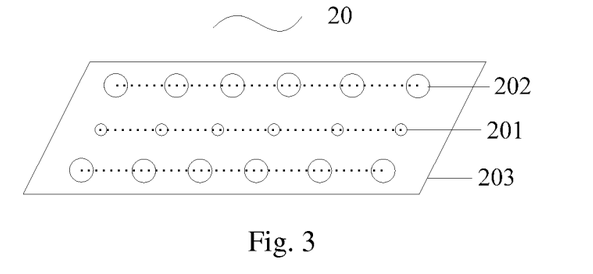
FIG. 3 is a structural schematic view II of a reflector sheet according to an embodiment of the present invention.

Optionally, as shown in FIG. 2 and FIG. 3, the first apertures 201 can be arranged linearly in the reflector sheet body 203, the second apertures 202 can also be arranged linearly in the reflector sheet body 203, and the first apertures 201 are arranged in a direction parallel to that of the second apertures 202.

Specifically, the first apertures 201 and the second apertures 202 can be provided in the reflector sheet body 203 along the same direction in a row, wherein different rows of the second apertures 202 can be provided between two adjacent rows of the first apertures 201 and different rows of the first apertures 201 can also be provided between two adjacent rows of the second apertures 202.

For example, the first apertures 201 can be provided in odd rows in the reflector sheet body 203 and the second apertures 202 can be provided in even rows in the reflector sheet body 203, and vice versa.

It shall be noted that the embodiments of the present invention only define that the first apertures 201 and the second apertures 202 are arranged linearly along directions parallel to each other, but fail to define the corresponding relationship between the first apertures 201 and the second apertures 202 in different rows, which may be aligned or staggered.

Further, the first apertures 201 that are arranged linearly and the second apertures 202 that are arranged linearly can be arranged alternately in the reflector sheet body 203.

On this basis, a row of the second apertures 202 will be provided between any two adjacent rows of the first apertures 201. As such, the second apertures 202 can provide a uniform space for stress release for the deformation of the reflector sheet 20 caused by thermal expansion, thereby avoiding uneven stress release caused by an excessively small space of part of the region.

Figure 4:
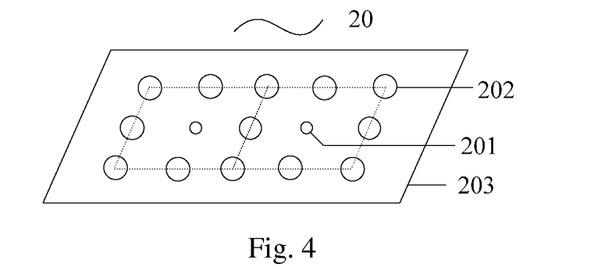
FIG. 4 is a structural schematic view III of a reflector sheet according to an embodiment of the present invention.
Figure 5:
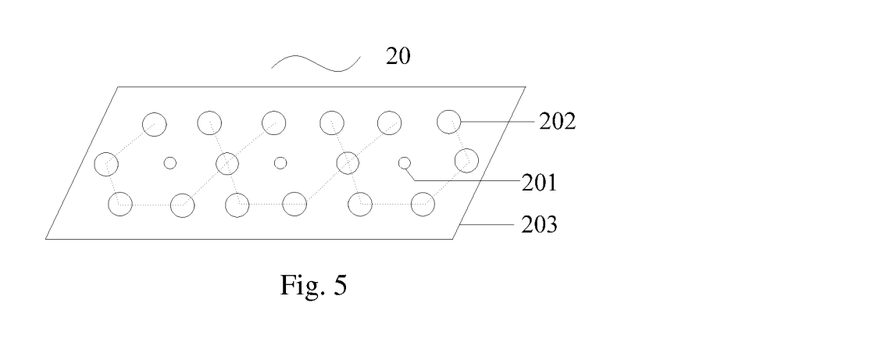
FIG. 5 is a structural schematic view IV of a reflector sheet according to an embodiment of the present invention.

Optionally, as shown in FIG. 4 and FIG. 5, the first apertures 201 can be arranged in a regular polygonal array in the reflector sheet body 203 and each of the second apertures 202 can be located at a center of each regular polygon of the regular polygonal array; or the second apertures 202 can be arranged in a regular polygonal array in the reflector sheet body 203 and each of the first apertures 201 can be located at a center of each regular polygon of the regular polygonal array.

The regular polygonal array may comprise, but not limited to, a regular polygon selected from the group consisting of regular triangle, square, and regular hexagon.

On this basis, in order to ensure that the reflector sheet body 203 obtains a relatively larger space for deformation in the case that the reflector sheet body 203 and the luminous body are engaged with each other, the first apertures 201 and the second apertures 202 are preferably arranged in the latter mode, i.e., the second apertures 202 are arranged in a regular polygonal array in the reflector sheet body 203 and the first apertures 201 are located at a center of each regular polygon of the regular polygonal array.

As such, in each regular polygon, the first apertures 201 are located only at a center of the regular polygon and the second apertures 202 are located at each vertex of the regular polygon; in this arrangement, more of the second apertures 202 can be distributed in each regular polygon so as to reserve a larger space for deformation during thermal expansion of the reflector sheet body 203.

It should be noted that in one aspect, the arrangements of the first apertures 201 and the second apertures 202 in every regular polygon are not limited to the above two modes, and there may be other arrangements as well, which will not be specified herein. In another aspect, the pattern arranged in an array composed of the first apertures 201 and/or the second apertures 202 can also be any polygon such as a common hexagon (i.e., an irregular hexagon), and the first apertures 201 and the second apertures 202 can occupy the vertex position of the above polygon irregularly, which will not be specified herein.

In view of the foregoing, optionally, each of the first apertures 201 may have a shape selected from the group consisting of a Reuleaux triangle, a circle, an oval and a rectangle, and/or each of the second apertures 202 may have a shape selected from the group consisting of a Reuleaux triangle, a circle, an oval and a rectangle.

Of course, the shape of the first apertures 201 and/or the shape of the second apertures 202 is/are not limited thereto, i.e., any other shape is allowed as long as it can achieve its own function.

In this case, the shape of the first apertures 201 can be designed according to the specific shape of the luminous body and the shape of the second apertures 202 can be the same as that of the first apertures 201.

Figure 6:
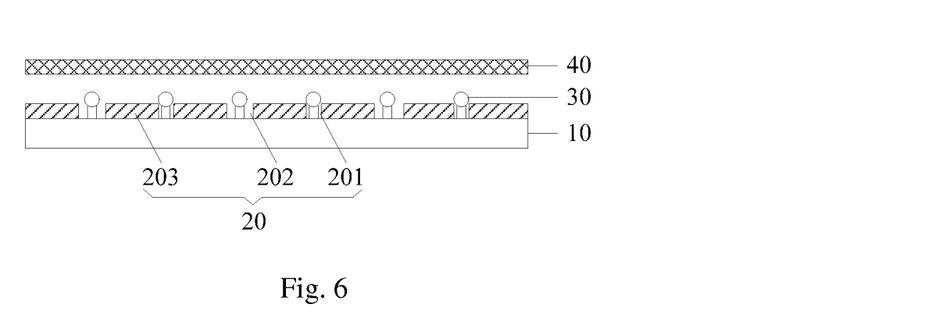
FIG. 6 is a structural schematic view of a backlight module according to an embodiment of the present invention.

An embodiment of the present invention further provides a backlight module, as shown in FIG. 6, comprising a back plate 10 and luminous bodies 30 fixed on the back plate 10; the backlight module may further comprise the above reflector sheet 20, wherein luminous surfaces of the luminous bodies 30 is located on a side of the reflector sheet 20 facing away from the back plate 10.

Specifically, the reflector sheet 20 is provided with apertures and the luminous bodies 30 can pass through the apertures to allow their luminous surfaces to be located on a side of the reflection surface of the reflector sheet 20.

It should be noted that the luminous bodies 30 are preferably point light source luminous bodies. Since the point light source luminous bodies generally need to be provided on a circuit board, the back plate 10 described herein actually refers to a back plate provided with a circuit board, i.e., the back plate 10 comprises a back plate substrate and a circuit board fixed on the back plate substrate.

On this basis, luminous surfaces of the luminous bodies 30 can be located on a side of the reflector sheet 20 facing away from the back plate 10 (i.e., a side of a reflection surface) while support structures of the luminous bodies 30 need to pass through the apertures in the reflector sheet 20 to be fixed on the back plate 10.

Each of the first apertures 201 of the reflector sheet 20 can just allow the luminous bodies 30 to pass therethrough and each of the second apertures 202 of the reflector sheet 20 can reserve a certain gap between the reflector sheet body 203 and the luminous bodies 30.

In view of the foregoing, the luminous bodies 30 may comprise a plurality of LED devices.

Specifically, each of the LED devices may be comprised of an LED chip, a packaging structure and a light-exiting cup, wherein the LED chip can be provided in a sealed environment formed by the packaging structure and the light-exiting cup.

In this way, the packaging structure of the LED devices can pass through the apertures of the reflector sheet 20 and the luminous surfaces of the LED devices can be located on the side of the reflecting surface of the reflector sheet 20.

As such, it can be seen that the shape and size of the luminous bodies 30 are the same as that of the LED devices; further, the shape and size of the LED devices actually refer to the shape and size of the packaging structure of the LED device.

On this basis, each of the first apertures 201 of the reflector sheet 20 preferably has a shape and a size matching that of the LED devices; each of the second apertures 202 of the reflector sheet 20 preferably has a shape matching that of the LED devices and each of the second apertures 202 has a size greater than that of the LED devices.

Regarding the second apertures 202 configured for reserving a gap between the luminous bodies 30 and the reflector sheet body 203, the thermal deformation in an intermediate region of the reflector sheet 20 is more serious than that in a peripheral region of the reflector sheet 20. Therefore, in the embodiments of the present invention, the second apertures 202 in an intermediate region of the reflector sheet 20 can have a size greater than that of the second apertures in a peripheral region of the reflector sheet 20, thereby reserving a greater gap for an intermediate region of the reflector sheet 20 to make it easy for the reflector sheet body 203 to release stress resulting from thermal expansion.

Optionally, as shown in FIG. 6, the backlight module may further comprise an optical film 40.

The optical film 40 may comprise a diffusion sheet, a prism sheet, a brightness enhancement film and the like, which can be combined randomly according to the actual need.

On this basis, the optical film 40 can be fixed by a plastic frame (not shown), which can be fixed and engaged in the back plate 10.

Figure 7:
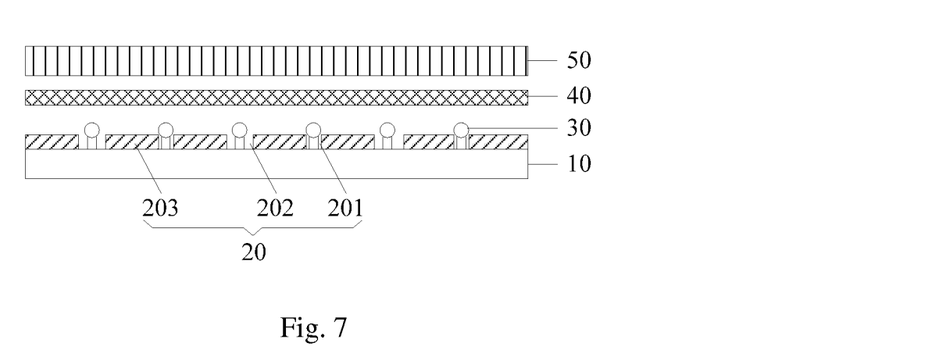
FIG. 7 is a structural schematic view of a display apparatus according to an embodiment of the present invention.
Figure 8:
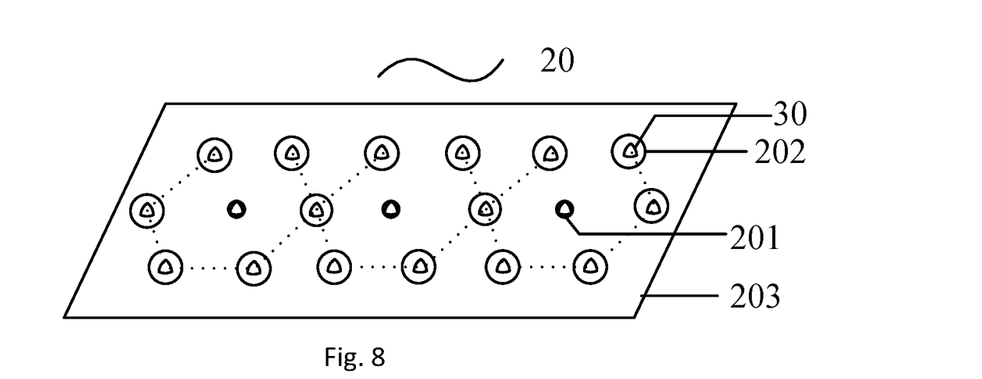
FIG. 8 is a structural schematic view of a reflector sheet according to an embodiment of the present invention.
Figure 9:
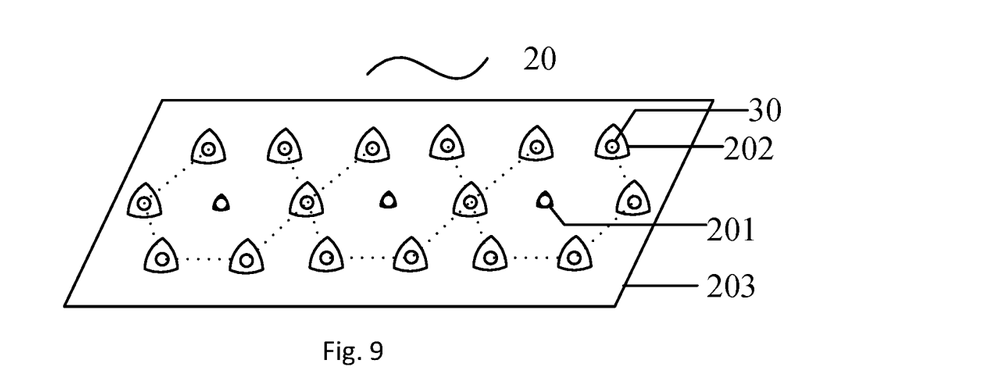
FIG. 9 is a structural schematic view of a reflector sheet according to an embodiment of the present invention.

The embodiments of the present invention provide a display apparatus, as shown in FIG. 7, comprising a display panel 50 and a backlight module, wherein the backlight module is the above backlight module.

It should be noted that the display apparatus can be a non-self-luminous display apparatus such as a liquid crystal display or a liquid crystal display television, and by providing backlight using the backlight module provided in the embodiments of the present invention, the display apparatus can effectively prevent uneven light-exiting caused by deformation of the reflector sheet 20 and improve display quality.

The present embodiments comprise the following content:

Embodiment 1

A reflector sheet comprising: a reflector sheet body, and apertures located in the reflector sheet body and configured for allowing a luminous body to pass therethrough, the apertures comprising first apertures and second apertures, wherein: each of the first apertures is configured for relatively fixing a luminous body passing therethrough and the reflector sheet body, and each of the second apertures is configured for reserving a gap between a luminous body passing therethrough and the reflector sheet body.

Embodiment 2

The reflector sheet according to Embodiment 1, wherein each of the first apertures of the reflector sheet has a shape and a size matching that of the luminous body passing therethrough; and each of the second apertures of the reflector sheet has a size greater than that of the luminous body passing therethrough.

Embodiment 3

The reflector sheet according to Embodiment 1 or 2, wherein each of the first apertures of the reflector sheet has three or more contact points in contact with the luminous body passing therethrough, to relatively fix the luminous body passing therethrough and the reflector sheet body.

Embodiment 4

The reflector sheet according to any one of Embodiments 1 to 3, wherein each of the second apertures has a size that is 110% or more, or 120% or more, or 130% or more, or 140% or more, or 150% or more larger than that of the first apertures.

Embodiment 5

The reflector sheet according to any one of Embodiments 1 to 3, wherein each of the second apertures has a size that is 110% or more, or 120% or more, or 130% or more, or 140% or more, or 150% or more larger than that of the luminous body passing therethrough.

Embodiment 6

The reflector sheet according to any one of Embodiments 1 to 5, wherein the first apertures are arranged linearly in the reflector sheet body, the second apertures are arranged linearly in the reflector sheet body, and the first apertures are arranged in a direction parallel to that of the second apertures.

Embodiment 7

The reflector sheet according to Embodiment 6, wherein the first apertures that are arranged linearly and the second apertures that are arranged linearly are arranged alternately.

Embodiment 8

The reflector sheet according to any one of Embodiments 1 to 5, wherein the first apertures are arranged in a regular polygonal array in the reflector sheet body, and the second apertures are located at a center of each regular polygon of the regular polygonal array; or the second apertures are arranged in a regular polygonal array in the reflector sheet body, and the first apertures are located at a center of each regular polygon of the regular polygonal array.

Embodiment 9

The reflector sheet according to Embodiment 8, wherein the regular polygonal array comprises a regular polygon selected from the group consisting of regular triangle, square, regular pentagon, regular hexagon, regular heptagon, regular octagon, and regular dodecagon.

Embodiment 10

The reflector sheet according to any one of Embodiments 1 to 9, wherein the first apertures have a shape selected from the group consisting of Reuleaux triangle, circle, oval and rectangle, and/or the second apertures have a shape selected from the group consisting of Reuleaux triangle, circle, oval and rectangle.

Embodiment 11

The reflector sheet according to any one of Embodiments 1 to 10, wherein each of the second apertures in an intermediate region of the reflector sheet has a size greater than that of each of the second apertures in a peripheral region of the reflector sheet.

Embodiment 12

A backlight module, comprising a back plate, and a luminous body fixed on the back plate; wherein: the backlight module further comprises the reflector sheet according to any one of Embodiments 1 to 11; and wherein a luminous surface of the luminous body is located on a side of the reflector sheet facing away from the back plate.

Embodiment 13

The backlight module according to Embodiment 12, wherein the luminous body comprises a plurality of light-emitting diode devices.

Embodiment 14

The backlight module according to Embodiment 13, wherein each of the first apertures of the reflector sheet has a shape and a size matching that of the light-emitting diode devices passing therethrough; and each of the second apertures of the reflector sheet has a size greater than that of the light-emitting diode devices passing therethrough.

Embodiment 15

The backlight module according to Embodiment 14, wherein each of the first apertures of the reflector sheet has three or more contact points in contact with the luminous body passing therethrough, to relatively fix the luminous body passing therethrough and the reflector sheet body.

Embodiment 16

The backlight module according to any one of Embodiments 12 to 15, wherein the luminous bodies are point light source luminous bodies.

Embodiment 17

The backlight module according to any one of Embodiments 12 to 16, wherein the back plate comprises a back plate substrate and a circuit board fixed on the back plate substrate.

Embodiment 18

The backlight module according to any one of Embodiments 12 to 17, wherein the luminous surfaces of the luminous bodies are located on a side of the reflector sheet facing away from the back plate (i.e., a side of a reflecting surface) while support structures of the luminous bodies pass through the first or second apertures of the reflector sheet to be fixed on the back plate.

Embodiment 19

A display apparatus comprising a display panel and a backlight module, wherein the backlight module is the backlight module according to any one of Embodiments 12 to 18.

Embodiment 20

The display apparatus according to Embodiment 19, wherein the display apparatus is a liquid crystal display (LCD) or a liquid-crystal display television.

The above are merely exemplary embodiments of the present invention, and are not intended to limit the scope of protection of the present invention, which is yet determined by the appended claims.

The present application claims the priority of the Chinese Patent Application No. 201420574881.3 submitted on Sep. 30, 2014, and the content disclosed in the above Chinese patent application is incorporated herein by reference as part of the present application.

The invention claimed is:
1. A reflector sheet comprising
a reflector sheet body, and
apertures located in the reflector sheet body and configured for allowing a luminous body to pass therethrough, the apertures comprising first apertures and second apertures, wherein:
each of the first apertures is configured for relatively fixing a luminous body passing therethrough and the reflector sheet body,
each of the second apertures is configured for reserving a gap between a luminous body passing therethrough and the reflector sheet body, and
the second apertures are arranged in a regular polygonal array in the reflector sheet body, and the first apertures are located at a center of each regular polygon of the regular polygonal array, wherein each of the second apertures in an intermediate region of the reflector sheet has a size greater than that of each of the second apertures in a peripheral region of the reflector sheet.

2. The reflector sheet according to claim 1, wherein each of the first apertures of the reflector sheet has a shape and a size configured for matching that of the luminous body passing therethrough; and
each of the second apertures of the reflector sheet has a size greater than that of the luminous body passing therethrough.

3. The reflector sheet according to claim 1, wherein each of the first apertures of the reflector sheet has three or more contact points configured for contacting with the luminous body passing therethrough, to relatively fix the luminous body passing therethrough and the reflector sheet body.

4. The reflector sheet according to claim 1, wherein each of the second apertures has a size that is 110% or more, or 120% or more, or 130% or more, or 140% or more, or 150% or more larger than that of the first apertures.

5. The reflector sheet according to claim 1, wherein each of the second apertures has a size that is 110% or more, or 120% or more, or 130% or more, or 140% or more, or 150% or more larger than that of the luminous body passing therethrough.

6. The reflector sheet according to claim 1, wherein the regular polygonal array comprises a regular polygon selected from the group consisting of regular triangle, square, regular pentagon, regular hexagon, regular heptagon, regular octagon, and regular dodecagon.

7. The reflector sheet according to claim 1, wherein the first apertures have a shape selected from the group consisting of Reuleaux triangle, circle, oval and rectangle, and/or the second apertures have a shape selected from the group consisting of Reuleaux triangle, circle, oval and rectangle.

8. A backlight module, comprising
a back plate, and
luminous bodies fixed on the back plate;
wherein:
the backlight module further comprises the reflector sheet according to claim 1;
wherein luminous surfaces of the luminous bodies are located on a side of the reflector sheet facing away from the back plate.

9. The backlight module according to claim 8, wherein the luminous bodies comprise a plurality of light-emitting diode devices.

10. The backlight module according to claim 9, wherein each of the first apertures of the reflector sheet has a shape and a size matching that of the light-emitting diode devices passing therethrough; and
each of the second apertures of the reflector sheet has a size greater than that of the light-emitting diode devices passing therethrough.

11. The backlight module according to claim 10, wherein each of the first apertures of the reflector sheet has three or more contact points in contact with the luminous body passing therethrough, to relatively fix the luminous body passing therethrough and the reflector sheet body.

12. The backlight module according to claim 8, wherein the luminous bodies are point light source luminous bodies.

13. The backlight module according to claim 8, wherein the back plate comprises a back plate substrate and a circuit board fixed on the back plate substrate.

14. The backlight module according to claim 8, wherein the luminous surfaces of the luminous bodies are located on a side of the reflector sheet facing away from the back plate (i.e., a side of a reflecting surface) while support structures of the luminous bodies pass through the first or second apertures of the reflector sheet to be fixed on the back plate.

15. A display apparatus comprising a display panel and a backlight module, wherein the backlight module is the backlight module according to claim 8.

16. The display apparatus according to claim 15, wherein the display apparatus is a liquid crystal display (LCD) or a liquid-crystal display television.

* * * * *